United States Patent
Lorentzen et al.

(10) Patent No.: US 11,930,726 B2
(45) Date of Patent: Mar. 19, 2024

(54) MACHINE-VISION SYSTEM FOR TRACKING AND QUANTIFYING MISSED TASSEL DURING A DETASSELING OPERATION

(71) Applicant: DEERE & COMPANY, Moline, IL (US)

(72) Inventors: Robert E. Lorentzen, Bondurant, IA (US); Michael M. Miller, Mason City, IA (US); Kent A. Klemme, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 738 days.

(21) Appl. No.: 17/080,457

(22) Filed: Oct. 26, 2020

(65) Prior Publication Data

US 2022/0124956 A1     Apr. 28, 2022

(51) Int. Cl.
*A01B 17/00*     (2006.01)
*A01B 35/32*     (2006.01)
(Continued)

(52) U.S. Cl.
CPC ............ *A01B 17/002* (2013.01); *A01B 35/32* (2013.01); *A01B 79/005* (2013.01); *G06T 7/73* (2017.01);
(Continued)

(58) Field of Classification Search
CPC ..... A01B 17/002; A01B 35/32; A01B 79/005; G06T 7/73; G06T 7/90;
(Continued)

(56) References Cited

U.S. PATENT DOCUMENTS 9,282,688 B2    3/2016    Casper et al.
9,554,098 B2    1/2017    Casper et al.
(Continued)

FOREIGN PATENT DOCUMENTS

EP          3226672 B1    11/2018
WO    WO2019025827 A1    2/2019
(Continued)

OTHER PUBLICATIONS

Unknown, "What Do They Mean? Corn Vocabulary", Date published Jun. 5, 2019, Retrieved from https://iowaagliteracy.wordpress.com/2019/06/05/what-do-they-mean-corn-vocabulary/ (Year: 2019).*
(Continued)

*Primary Examiner* — Calvin Cheung
(74) *Attorney, Agent, or Firm* — Taft Stettinius & Hollister LLP; Stephen F. Rost

(57) ABSTRACT

Systems and methods for tracking missed tassels left by a detasseling machine. Rear-facing image data is captured by a camera positioned with a field of view behind the detasseling machine and image processing is applied to the rear-facing image data to quantity a missed tassel metric for a geospatial area. An indication of the missed tassel metric is displayed to an operator of the detasseling machine. In some implementations, the displayed indication of the missed tassel metric is updated in near real-time as the detasseling machine continue to operate in the crop field as an accumulated total missed tassel percentage for the entire crop field and/or as a missed tassel map indicating a percentage of missed tassels for each of a plurality of different geospatial sub-areas in the crop field.

20 Claims, 8 Drawing Sheets

(51) Int. Cl.
*A01B 79/00* (2006.01)
*G06T 7/73* (2017.01)
*G06T 7/90* (2017.01)
*G06V 20/10* (2022.01)

(52) U.S. Cl.
CPC .............. *G06T 7/90* (2017.01); *G06V 20/188* (2022.01); *G06T 2207/10024* (2013.01); *G06T 2207/30188* (2013.01)

(58) Field of Classification Search
CPC .......... G06T 2207/10024; G06T 2207/30188; G06V 20/188; A01D 47/00; A01H 1/02
See application file for complete search history.

(56) References Cited

U.S. PATENT DOCUMENTS

| | | | |
|---|---|---|---|
| 10,172,289 | B2 | 1/2019 | Briquet-Kerestedjian et al. |
| 10,342,176 | B2 | 7/2019 | Hashimoto |
| 2017/0251589 | A1 | 9/2017 | Tippery |
| 2018/0012345 | A1 | 1/2018 | Ogawa et al. |
| 2019/0150357 | A1 | 5/2019 | Wu |
| 2020/0288625 | A1 | 7/2020 | Pilzweger |
| 2021/0132621 | A1 | 5/2021 | Ferren |
| 2021/0181078 | A1 | 6/2021 | Marzu et al. |
| 2021/0289707 | A1* | 9/2021 | Schloesser ............. A01D 47/00 |
| 2022/0124980 | A1 | 4/2022 | Lorentzen et al. |

FOREIGN PATENT DOCUMENTS

| | | |
|---|---|---|
| WO | WO2019232179 A1 | 12/2019 |
| WO | WO2021231159 A1 | 11/2021 |

OTHER PUBLICATIONS

Ferhat Kurtulmuş, İsmail Kavdir, "Detecting corn tassels using computer vision and support vector machines", Expert Systems with Applications, vol. 41, Issue 16, 2014, pp. 7390-7397, ISSN 0957-4174 (Year: 2014).*

JP 2010070929 A with English translation. Date filed Sep. 16, 2008. Date published Apr. 2, 2010. (Year: 2010).*

JP 2018111922 A with English translation. Date filed Jan. 6, 2017. Date published Jul. 19, 2018. (Year: 2018).*

U.S. Appl. No. 62/992,025, filed Mar. 19, 2020. (Year: 2020).*

Extended European Search Report and Written Opinion issued in European Patent Application No. 21201288.4, dated Mar. 18, 2022, in 08 pages.

Lu et al., "TasselNet: Counting maize tassels in the wild via local counts regression network," Huazhong University of Science and Technology, 2017, pp. 1-14.

Sentera, "Build Better Forecasts and Make Better Decisions with Tassel Count," <https://sentera.com/accurate-tassel-count/> web page publicly available at least as early as May 15, 2020.

* cited by examiner

MACHINE-VISION SYSTEM FOR TRACKING AND QUANTIFYING MISSED TASSEL DURING A DETASSELING OPERATION

BACKGROUND

The present invention relates to systems and methods for operating a detasseling machine. A detasseling machine is configured to remove the immature, pollen-producing part of a plant (i.e., the "tassel") for the purposes of cross-pollinizing.

SUMMARY

In one embodiment, the invention provides a method for tracking missed tassels left by a detasseling machine. Rear-facing image data is captured by a camera positioned on a main vehicle body of the detasseling machine with a field of view behind the detasseling machine. Image processing is applied to the rear-facing image data to quantify a missed tassel metric for a geospatial area based on the rear-facing image data. An indication of the missed tassel metric for the geospatial area is displayed to an operator of the detasseling machine. In some implementations, the displayed indication of the missed tassel metric is updated in near real-time as the detasseling machine continue to operate in the field. In some implementations, the indication of the missed tassel metric is displayed as a periodically updated accumulated total missed tassel percentage for all areas of a crop field in which the detasseling machine has completed the detasseling operation. In some implementations, the indication of the missed tassel metric is displayed as a missed tassel map indicating a percentage of missed tassel for each of a plurality of different geospatial sub-areas in the crop field.

In another embodiment, the invention provides a system for tracking missed tassels left by a detasseling machine. The system includes a rear-facing camera positioned on a main vehicle body of the detasseling machine with a field of view behind the detasseling machine, a display screen positioned within an operator cab of the detasseling machine, and an electronic controller. The electronic controller is configured to receive rear-facing image data captured by the rear-facing camera and to apply image processing to the rear-facing image data to quantify a missed tassel metric for a geospatial area based on the rear-facing image data. The electronic controller then transmits a signal to the display screen causing the display screen to output an indication of the missed tassel metric for the geospatial area.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
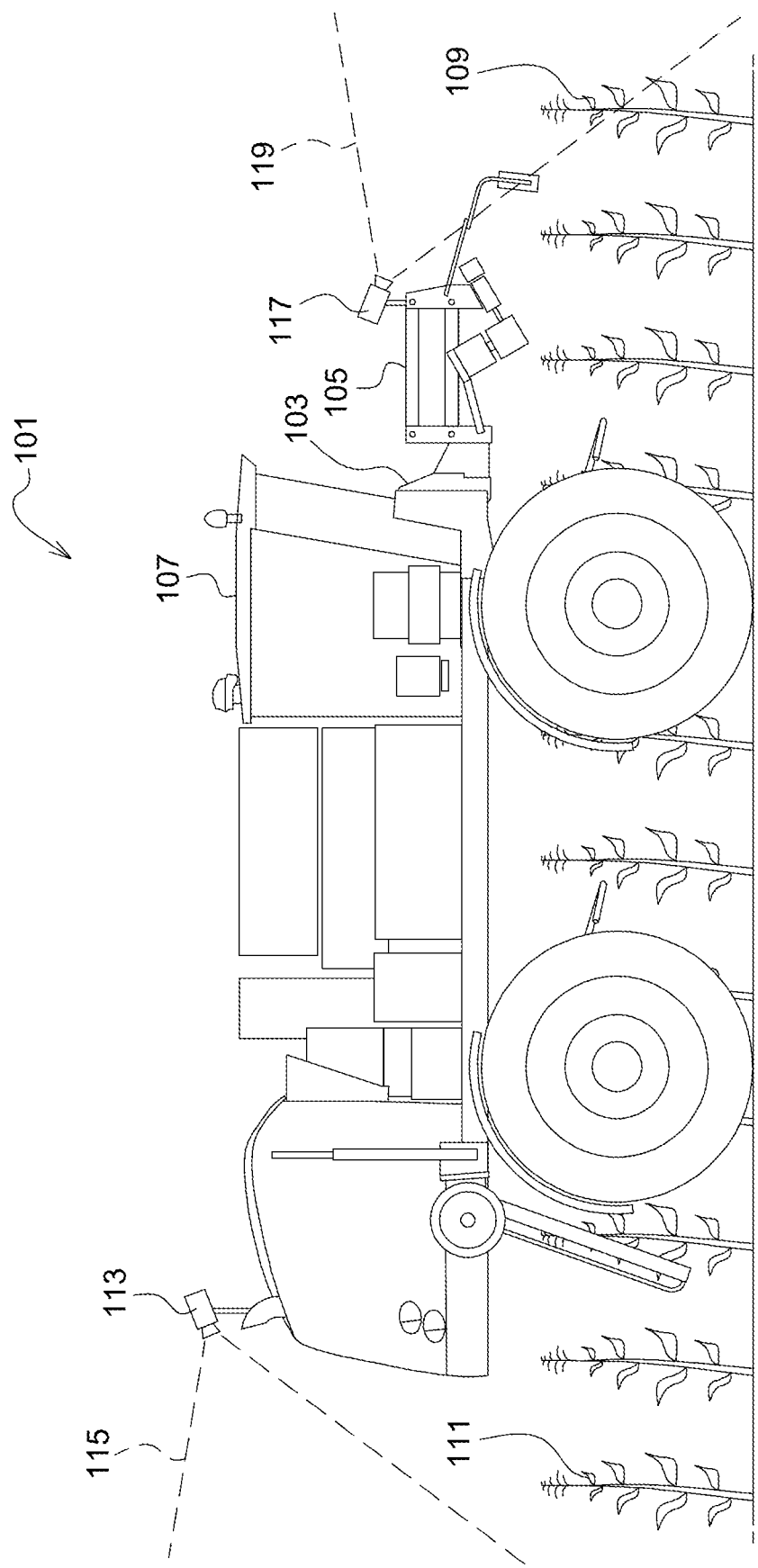
FIG. 1A is a side elevation view of a detasseler machine in accordance with one implementation.
Figure 1B:
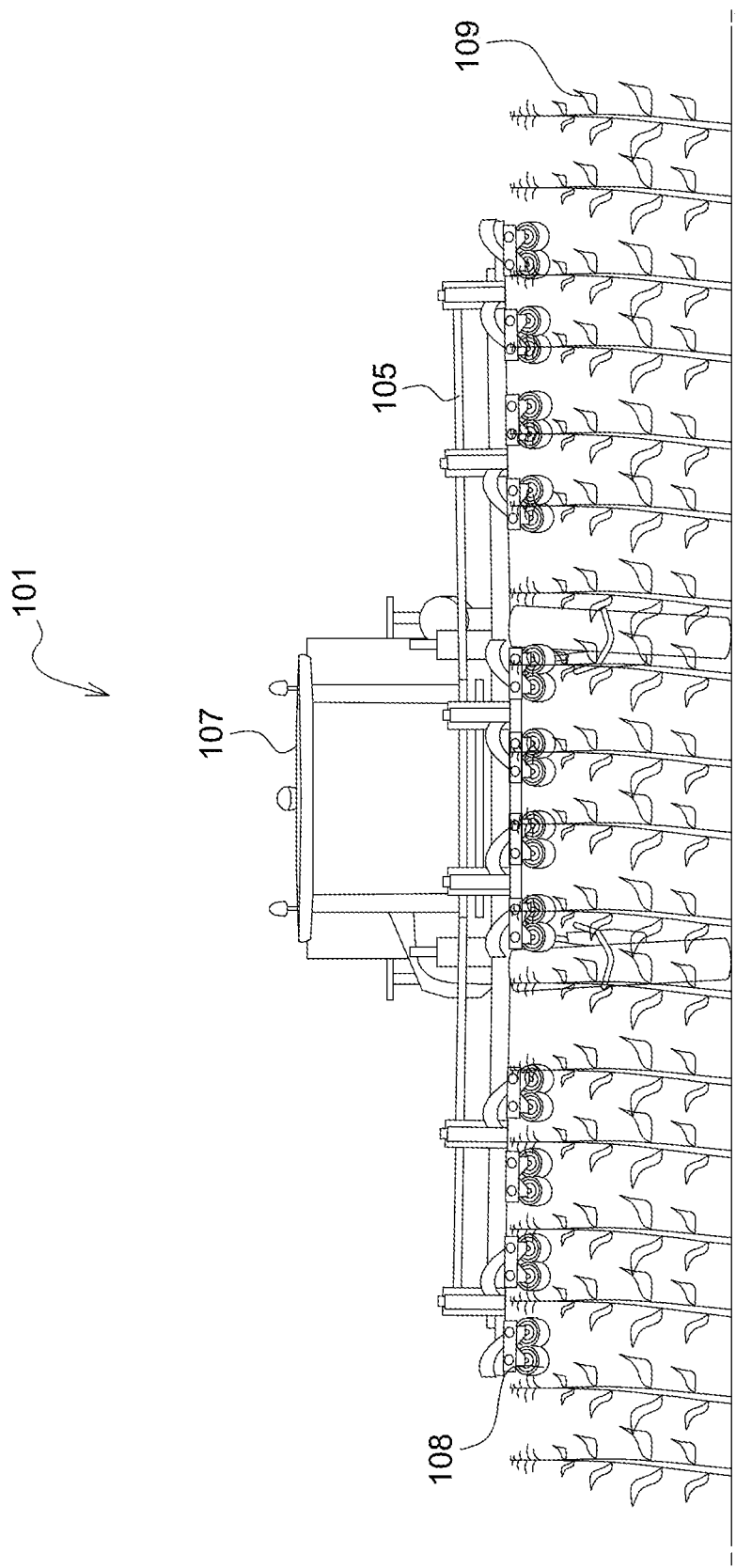
FIG. 1B is a front elevation view of the detasseler machine of FIG. 1A.

FIGS. 1A and 1B illustrate an example of a vehicle-based detasseler machine 101 for removing tassels from a corn crop. The machine 101 includes a main vehicle body 103 and a cutter header 105. As shown in FIG. 1B, the cutter header 105 includes a plurality of individual cutters 108 that each include a pulling mechanism such as, for example, a rotating blade. The operation of the cutter head can be adjusted, for example, by adjusting a rotational speed of the cutters 108 (e.g., using controllable speed electric motors for each cutter 108 or a transmission system for conveying mechanical rotation from the engine of the main vehicle body to the cutters 108) and/or adjusting a height of the cutter header 105 relative to the main vehicle body 105 (e.g., using a hydraulic lift system coupling the cutter header 105 to the main vehicle body 105). The main vehicle body 103 also includes an operator cab 107. As discussed in further detail below, an operator of the machine 101 sits in the operator cab 107 on the main vehicle body 103 and provides, through an operating input interface, operating control inputs for operating the main vehicle body 103 (e.g., vehicle steering controls and vehicle speed controls) and operating control inputs for operating the cutter head 105 (e.g., cutter speed controls and cutter header height controls).

As the vehicle-based detasseler machine moves through a crop field, the cutter header is operated to remove the tassels from the top of the growing corn crop. The tassel (i.e., the immature pollen-producing body of the corn plant) is removed from the top of the plant and allowed to fall to the ground as a mechanism for cross-breeding corn. As shown in FIG. 1A, the machine 101 moves through a field towards plants with an intact tassel (plants 109) and leaves behind plants with the tassel removed (plants 111).

In some implementations, machine detasseling is a two-stage process: first, a "cutter" is operated through the field to cut the top portions of the plants to a uniform height and, second, a "puller" is operated to pull the tassels that emerge from the plants about 24-48 hours after the tops of the plants are cut. In some implementations, two separate machines 101 are used for the cutting and pulling steps. In other implementations, the cutter header 105 of the machine 101 is selectively interchangeable with one cutter header 105 designed and configured to perform the cutting operation and another cutter header 105 designed and configured to perform the pulling operation. In still other implementations, a single cutter header 105 may be configured to perform both the cutting and the pulling operations or to remove the tassel from the plant without separate cutting & pulling operations. Accordingly, although the examples described herein may refer to a cutter header 105, the systems and methods described below are not necessarily limited to operation on a header that is designed solely for performing the cutting operation of the machine detasseling process.

Although the machine 101 is operated to remove as many tassels as possible, some tassels will likely be missed during the machine-based detasseling process. Using systems and methods, such as those described herein, the operation of the machine may be adjusted/regulated in real-time to improve the detasseling efficiency (i.e., reducing the number of "missed tassels") and to quantify and/or map the missed tassels that are left in the crop after the machine-based detasseling process is completed.

In the example of FIG. 1A, a rear-facing camera 113 is mounted on the main vehicle body 103 and positioned with a field of view 115 behind the main vehicle body 103. As shown in FIG. 1A, the rear-facing camera 113 is configured to capture image data including at least the top portion of the plants behind the main vehicle body 103 as the main vehicle body 103 moves through the field. In some implementations, the rear-facing camera 113 may include, for example, a fish-eye lens and/or a stereo-camera. As discussed in further detail below, image data captured by the rear-facing camera 113 is processed to detect and count plants in the rear-facing image data that still have their tassel after the main vehicle body 103 has passed over the plant (i.e., "missed tassels").

Although the rear-facing camera 113 is shown in the example of FIG. 1A as being positioned on top of the main vehicle body 103 and towards the rear, the placement of the rear-facing camera 113 may be different in other implementations. For example, the rear-facing camera 113 might be integrated into a rear surface of the main vehicle body 103 or might be positioned above the operator cab 107.

In some implementations, such as in the example of FIG. 1A, the machine 101 is also equipped with a front-facing camera 117 positioned and configured with a field of view 119 to capture image data of plants in front of the machine 101 before the machine 101 reaches them. As described in further detail below, in some implementations, the image data from the front-facing camera 117 is processed to detect and count plants in the forward-facing image data that have tassels. Additionally or alternatively, in some implementations, the image data from the front-facing camera 117 is processed and used to optimize operation of the machine 101 based on crop parameters such as, for example, crop height, alignment, tassel location, etc. Similar to the rear-facing camera 113 discussed above, in some implementations, the front-facing camera 117 may be configured to include a fish-eye lens and/or a stereo-camera. Also, while, in some implementations, the front-facing camera 117 may be mounted to the cutter header 105 (as shown in the example of FIG. 1A), the placement of the front-facing camera 117 may vary in other implementations. For example, the front-facing camera 117 may be integrated into the structure of the cutter header 105 or the main vehicle body 103. Alternatively, the front-facing camera 117 may be positioned at another location on the main vehicle body 103 (such as, for example, near the top of the operator cab 107) so that the field of view 119 of the front-facing camera 117 includes both the crop 109 and at least a portion of the cutter header 105.

Figure 2:
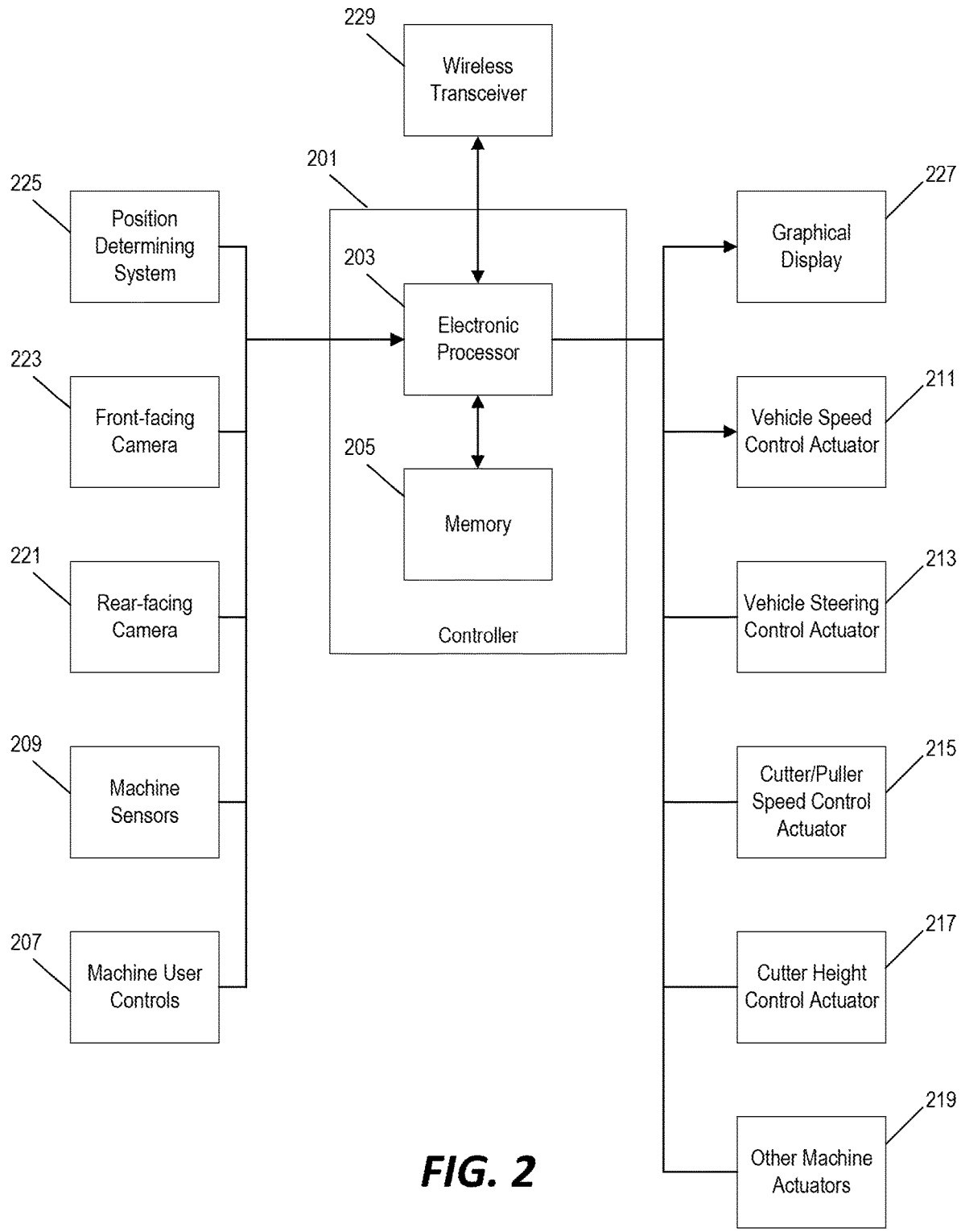
FIG. 2 is a block diagram of a control system for the detasseler machine of FIG. 1A.

FIG. 2 illustrates an example of a control system for the machine 101 of FIGS. 1A and 1B. An electronic controller 201 include an electronic processor 203 and a non-transitory, computer-readable memory 205. The memory 205 stores data and computer-executable instructions that are accessed and executed by the electronic processor 203 to provide the functionality of the controller 201 such as, for example, described in the further examples herein. The controller 201 is communicatively coupled to machine user controls 207 including, for example, steering wheel, joystick, pedal, and button controls positioned within the operator cab 107 of the machine 101 through which the operator provides operating input commands to the machine 101. The controller 201 is also communicatively coupled to a plurality of machine sensors 209 that are configured to monitor various different operating conditions of the machine 101. For example, the machine sensors 209 might include a vehicle speed sensor, a steering angle sensor, and a "photo eye" sensor configured to determine whether the height of the crop passed by the machine 101 exceeds a certain threshold relative to the main vehicle body 103 and/or the cutter header 105. The controller 201 is also communicatively coupled to and configured to receive image data from the rear-facing camera 221 and the forward-facing camera 223 (as discussed above). Finally, in some implementations, the controller 201 is also communicatively coupled to a position determining system 225 such as, for example, a global-positioning system (GPS) and is configured to determine a geospatial location of the machine 101 based on the output received from the position determining system 225.

The controller 201 is also configured to provide control outputs to various actuators of the machine 101. For example, the controller 201 is configured to controllably adjust the vehicle speed of the machine 101 by transmitting a vehicle speed control signal to a vehicle speed control actuator 211 (e.g., a controllable throttle or transmission of the main vehicle body 103). Similarly, the controller 201 is configured to controllably adjust the vehicle steering by transmitting a vehicle steering signal to a vehicle steering control actuator 213. The controller 201 is also configured to provide operational adjustment and control of the cutter header 105, for example, by transmitting a cutter/puller speed control signal to a cutter/puller speed control actuator 215 (e.g., an electric motor or a transmission for controllably adjusting mechanical power from the vehicle engine to each cutter 108) and by transmitting a cutter height control signal to a cutter height control actuator 217 (e.g., a hydraulic system configured to controllably adjust a height of the cutter header 105 relative to the main vehicle body 103). In various different implementations, the controller 201 may be further configured to generate and transmit other control signal in addition to or instead of those described above to other machine actuators 219.

In some implementations, the controller 201 is configured to generate the various control signals to the machine actuators based on user control inputs received through the machine user controls 207 and signal outputs from the machine sensors 209 indicative of different operating conditions. Additionally, in some implementations, the controller 201 may be configured to regulate and adjust the control signals transmitted to the actuators based on image data from the front-facing camera 223 and/or the rear-facing camera 221 in order to optimize operation of the machine 101 (as described further in the additional examples below).

In some implementations, the controller 201 is also communicatively coupled to a graphical display 227. In some implementations, the graphical display 227 is positioned within the operator cab 107 and is visible by an operator of the machine 101 during use. In some such implementations, the controller 201 provides an output signal to the graphical display 227 to control and adjust the information shown to the operator of the machine 101 on the graphical display 227. In various different implementations, the information displayed on the graphical display 227 may include, for example, vehicle speed, cutter speed, and/or an indication of missed tassels. Furthermore, in some implementations, the graphical display 227 may include a touch-sensitive display unit and, therefore, the controller 201 may be configured to output display information to the graphical display 227 and to also receive user input commands through the graphical display 227 that control the operation of the machine and/or the information displayed to the operator on the graphical display 227.

Finally, in some implementations, the controller 201 is communicatively coupled to a wireless transceiver 229 and is configured to communicate with one or more additional remote systems through the wireless transceiver 229. For example, in some implementations, the controller 201 may be configured to generate and transmit "missed tassel" maps to a remote computer server either after the detasseling operation is completed or in real-time as the machine 101 operates through the field.

Figure 3:
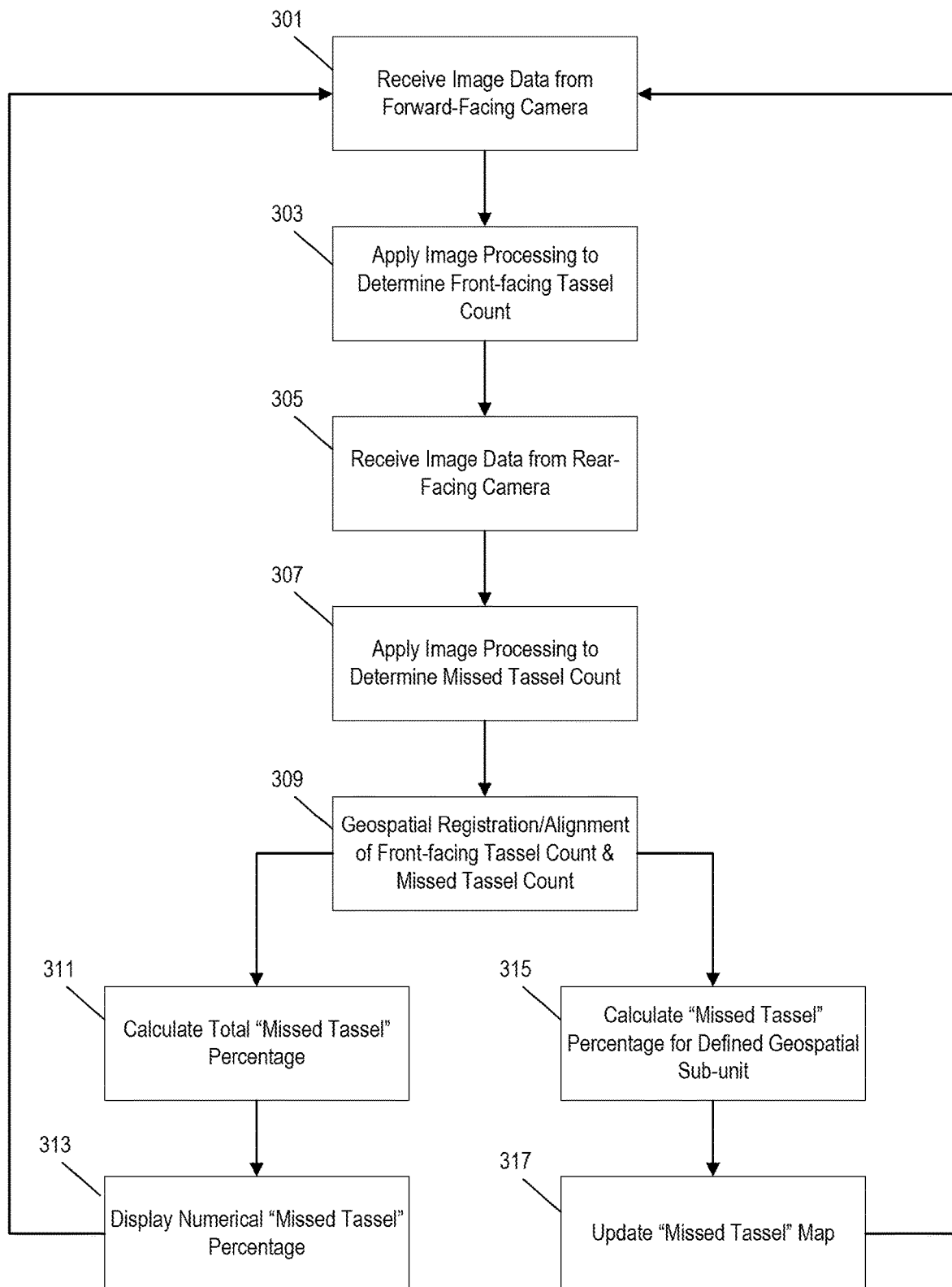
FIG. 3 is a flowchart of a method for quantifying and displaying information regarding missed tassels using the detasseler machine of FIG. 1A.

FIG. 3 illustrates an example of a method for detecting, quantifying, and presenting metrics on missed tassels during a detasseling operation performed by the machine 101 of FIG. 1A. The controller 201 receives front-facing image data from the front-facing camera 223 (step 301) and applies image processing techniques to detect and count a number of tassels in a geospatial area in front of the machine 101 based on the image data (step 303) before the detasseling machine 101 passes through that geospatial area. In doing so, the controller 201 is able to quantify a number of plants with tassels before the detasseling operation is performed (i.e., a "tassel count"). The geospatial area may include, for example, an area of a defined length and width relative to the detasseling machine 101. The controller 201 may be configured to apply various different image processing techniques in order to detect and count the number of tassels in the geospatial area including, for example, machine-learning image-processing techniques, color-based detection techniques, and/or shape-based detection techniques. Furthermore, in some implementations, the controller 201 is configured to analyze a single image corresponding to each geospatial area and to detect and count tassels in that single image. In other implementations, the controller 201 is configured to analyze a plurality of captured images that include at least a portion of the same geospatial area and to detect & count tassels in the geospatial area based on the plurality of images.

The controller 201 also receives rear-facing image data from the rear-facing camera 221 (step 305) and applies image processing techniques to automatically detect and count a number of tassels in a geospatial area behind the machine 101 based on the rear-facing image data (step 307) after the detasseling machine 101 has passed through that geospatial area. In doing so, the controller 201 is able to quantify a number of plants with tassels that were missed by the detasseling operation (i.e., "missed tassels"). Like the mechanism for quantifying the "tassel count" metric based on the front-facing image data, the controller 201 may be configured to determine the "missed tassel" metric for each geospatial area based on one or more rear-facing images captured by the rear-facing camera 221 and may utilize one or more of various different image processing techniques including, for example, machine-learning, color-based detection, and/or shape-based detection techniques.

In some implementations, the controller 201 is configured to perform a geospatial registration and/or alignment of the tassel count and missed tassel metrics such that the "tassel count" can be compared to the "missed tassel" metric for each defined geospatial area (step 309) and to calculate a "missed tassel" percentage (i.e., the percentage of tassels in the field that were missed by the machine 101 during the detasseling operation). In some implementations, the geospatial area corresponding to the image data and the calculated metrics is determined based on a geospatial position of the machine 101 when the image data is captured as indicated by the position determining system 225.

In the example of FIG. 3, the controller 201 periodically calculates and updates a total "missed tassel" percentage for the entire field by comparing an accumulated "tassel count" metric for the entire field to an accumulated "missed tassel" metric for the entire field (step 311). This total "missed tassel" percentage is then displayed to the operator (e.g., on the graphical display 227) (step 313). Alternatively or additionally, in some implementations, the total "missed tassel" percentage is transmitted to a remote server (e.g, via wireless transceiver 229) in real-time and/or after the detasseling operation is completed for the entire field.

In some implementations, in addition to or instead of calculating and presenting a total "missed tassel" percentage for the entire field, the controller 201 is configured to calculate a "missed tassel" percentage for each of a plurality of defined geospatial sub-units (step 315) by comparing the "missed tassel" metric and the "tassel count" metric for each individual geospatial area (step 315). As the missed tassel percentage is calculated for each additional geospatial sub-unit, a "missed tassel" map is updated in the memory 205 and/or on the graphical display 227. The missed tassel map can be displayed to the operator of the machine 101 via the graphical display 227 and/or, in some implementations, may be transmitted to a remote computer system via the wireless transceiver 229. In some implementations, the missed tassel map is transmitted to the remote computer system periodically while the machine 101 moves through the field performing the detasseling operation and/or as a completed missed tassel map after the detasseling operation is completed for the entire field.

Figure 4:
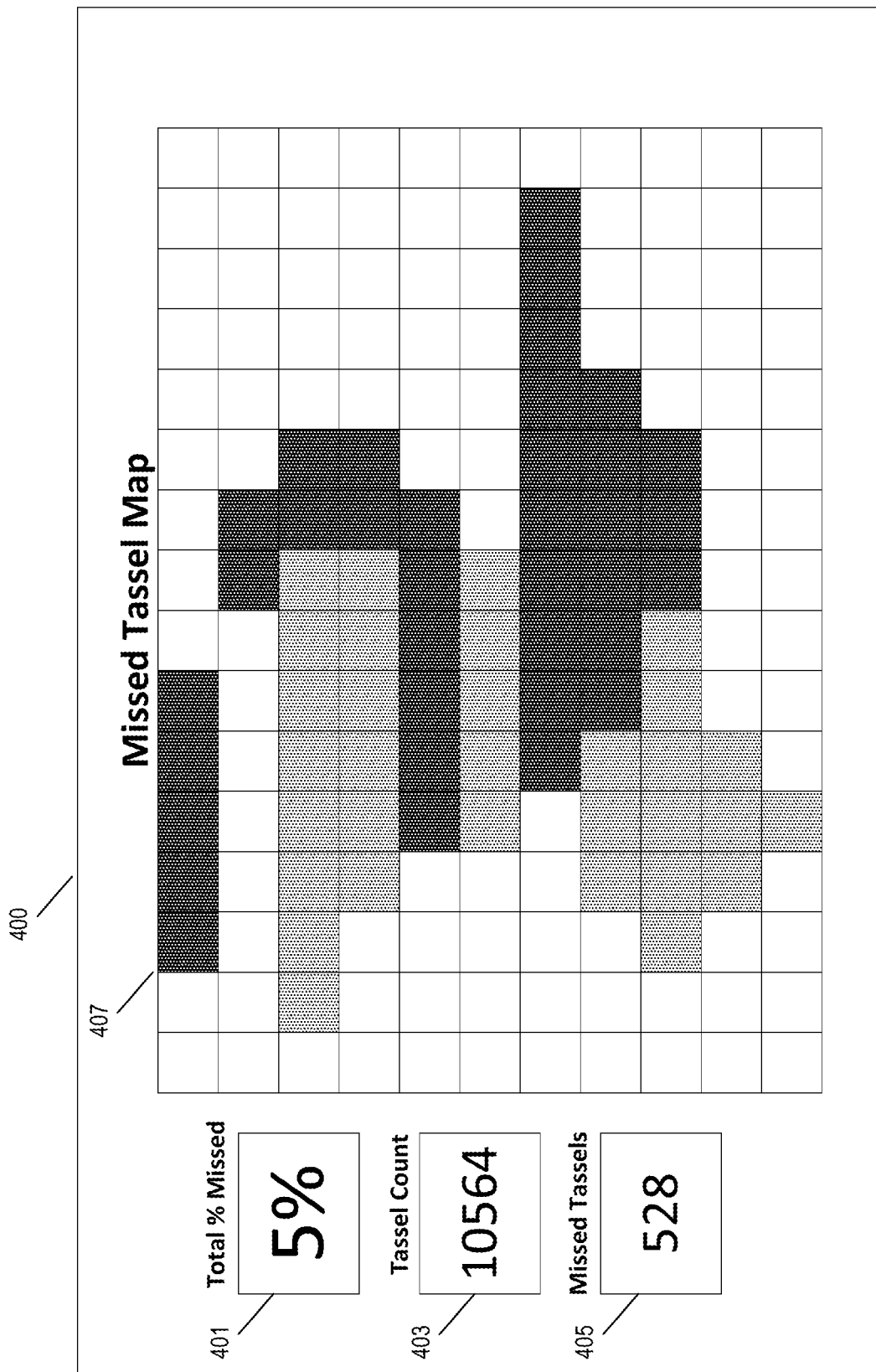
FIG. 4 is a screen shot of a graphical display for outputting the quantified missed tassel information determined by the method of FIG. 3.

FIG. 4 illustrates an example of a user interface display 400 that is displayed on the graphical display 227 to the operator of the machine and/or to another user on a remote computer system display. The user interface display 400 includes a listing of individual metrics relating to the detasseling operation including the total missed tassel percentage 401, a total tassel count 403 (i.e., the total number of tassels counted in the field so far based on the front-facing image data), and a total missed tassel metric 405 (i.e., the total number of missed tassels counted in the field so far based on the rear-facing image data).

The user interface display 400 also presents a missed tassel map 407. In the example of FIG. 4, the missed tassel map 407 includes a plurality of squares each corresponding to a different geospatial sub-unit in a corn field. As described above in reference to the method of FIG. 3, the controller 201 is configured to determine for each geospatial sub-unit a "tassel count" metric (based on front-facing image data), a "missed tassel" metric (based on rear-facing image data), and a missed tassel percentage (i.e., the "missed tassel" metric divided by the "tassel count" metric). In the example of FIG. 4, each square on the missed tassel map 407 is color-coded based on the calculated missed tassel percentage for the corresponding geospatial sub-unit. For example, if the calculated missed tassel percentage for a geospatial sub-unit is below a first threshold, the corresponding square is color-coded in a first color; if the calculated missed tassel percentage is above the first threshold and below a second threshold, the corresponding square is color-coded in a second color; and, if the calculated missed tassel percentage is above the second threshold, the corresponding square in the missed tassel map is color-coded in a third color.

In the example of FIG. 4, the color-coding of each square is increasingly dark color for increasingly higher missed tassel percentages. However, in other implementations, other gradually adjusted color scales may be used instead including, for example, color adjustments from red (indicating a relatively high missed tassel percentage) to green (indicating a relatively low missed tassel percentage with yellow indicating an intermediate missed tassel percentage. Furthermore, although the example of FIG. 4 shows only three different levels of color-coding, more or fewer color-coding levels may be used in other implementations. Furthermore, the size of each geospatial sub-unit can be greater or smaller in various different implementations including, for example, geospatial sub-units that each correspond to an individual plant. Accordingly, in some implementations where each geospatial sub-unit corresponds to a different individual plant, the color-coding provided by the missed tassel map may include, for example, only two color-coding levels (i.e., tassel missed or tassel pulled) or three color-coding levels (i.e., tassel missed, tassel pulled, or tassel partially removed).

In some implementations, the size, dimensions, and location of each geospatial sub-unit is determined prior to the detasseling operation as a grid map. In order implementations, the controller 201 may be configured to adaptively determine the size, dimensions, and/or location of each geospatial sub-unit based on observed information during the detasseling operation. For example, in implementations where each geospatial sub-unit corresponds to a different individual plant, the controller 201 may be configured to identify each individual plant in the field based on captured image data and to assign a geospatial sub-unit based on the location of the individual plant (e.g., based at least in part on the location of the machine 101 (as indicated by the positioned determining system 225) when the image data of the individual plant is captured and the relative location of the individual plant in the field of view of the camera).

As discussed in the examples above, the machine-vision-based system can report the percentage of tassels pulled in real time and provides a map of missed tassels and/or percentage of missed tassels in each of a plurality of geospatial sub-areas. These maps can then be displayed to teams to locate and manually pull the tassels that were missed by the machine 101. The machine-vision system in these examples is configured to count tassel and provides the operator of the detasseling machine 101 with real-time (or near real-time) feedback on the percent of tassels successfully pulled. In some implementations, the system also includes a mechanism to establish a stand count or an initial number of tassels that can then be compared with the number of missed tassels. In the examples described above, the front-facing image data captured by the front-facing camera 223 is used to determine the stand count (i.e., the "tassel count" metric). However, in other implementations, different mechanism may be used to determine the number of tassels before the tasseling operation and, therefore, in some implementations, the machine 101 might not include a front-facing camera 223. Finally, in some implementations, a sampling period is implemented to periodically calculate/update the metrics and mapping information that is output in order to provide near real-time feedback on the quality of job being done for the detasseling operation.

In some implementations, the controller 201 is configured to generate and transmit control signals to each of a plurality of actuators based on command inputs received from the operator through the machine user controls 207. In other implementations, at least some actuators may be mechanically or electronically linked directly to the corresponding machine user controls 207 so that intervention from the controller 201 is not needed in order to control the operation of the machine 101. In still other implementations, the controller 201 is configured to generate and transmit control signals that adjust the operation of the actuators such that the operation of the actuator is regulated by both the input received from the machine user controls 207 and the adjustment control signal received from the controller 201. Accordingly, in some implementations, the machine 101 is configured to operate based on inputs received from the machine user controls 207 and/or control signals generated by the controller 201 based on other input data. For example, in some implementations, the controller 201 is configured to provide automated adjustment of machine control parameters to optimize the tassel pull percentage based on vision system feedback. Accordingly, the controller 201 is configured to redirect machine performance to improve efficiency.

In some implementations, the controller 201 is configured to automatically adjust the machine parameters to optimize the percent pull, for example, by adjusting the speed of the puller wheels in the cutter header 105, adjusting the response time of the cutter header height control system, and/or adjusting the response time of the machine vehicle speed. In some implementations, the machine vision system provides a "look ahead" and adjustments to the operations of the machine 101 are made automatically based on crop parameters. For example, the controller 201 may be configured to apply automated adjustments that track the tassels (e.g., tassel height or lateral position) as they approach the machine. In some implementations, this "look ahead" system is optimized and retrained based on job quality as determined by the "missed tassel" count/percentage discussed above.

Figure 5:
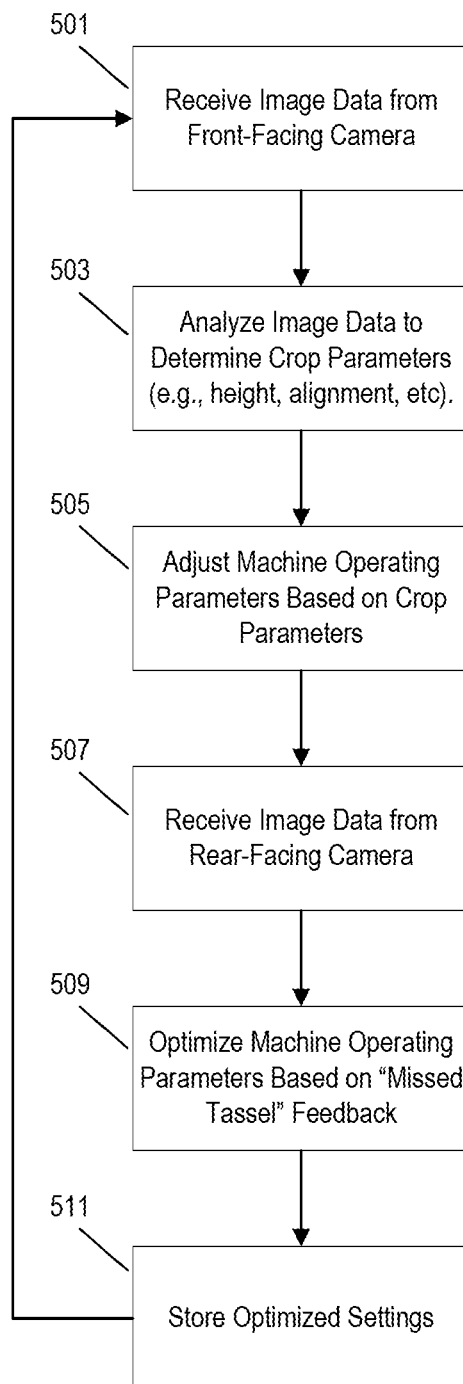
FIG. 5 is a flowchart of a method for adjusting and optimizing machine operating settings for the detasseler machine of FIG. 1A based on image data.

FIG. 5 illustrates one example of a method performed by the controller 201 to apply automated adjustments to the operation of the machine 101 based on information about the crops as determined from the captured image data. The controller 201 receives front-facing image data from the front-facing camera (step 501) and analyzes the image data to determine a set of crop parameters including, for example, crop height, crop alignment, etc. (step 503). The controller 201 then adjusts one or more machine operating parameters (e.g., the control settings applied to one or more actuators) based on the determined crop parameters (step 505). As feedback to evaluate the effectiveness of the automated adjustments, the controller 201 also receives rear-facing image data from the rear-facing camera (step 507) and optimizes the machine operating parameters based on the "missed tassel" feedback information (step 509). The optimized settings are then stored to memory (step 511) so that the optimized settings will be applied automatically when a similar set of crop parameters is encountered in the future.

Figure 6:
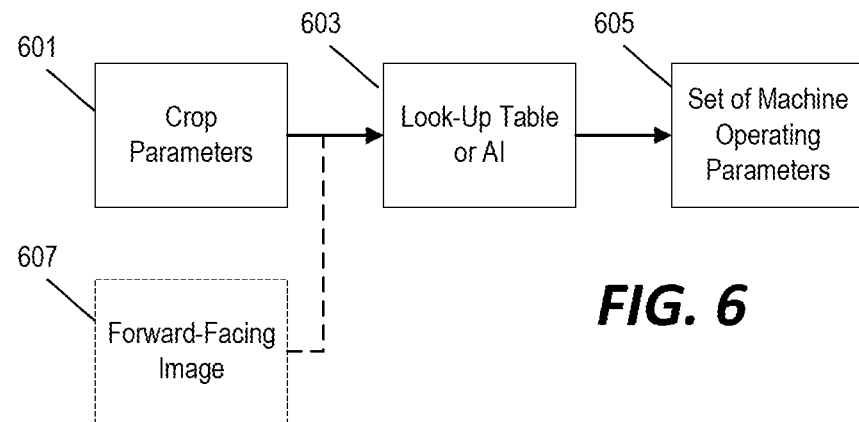
FIG. 6 is a flowchart of a method for determining a set of machine operating parameters to be applied based on crop parameters indicated by captured image data using the detasseler machine of FIG. 1A.

FIG. 6 illustrates an example of a method for determining a set of machine operating parameters based on the crop parameters. In this example, the set of determine crop parameters 601 is provided as input to a look-up table or an artificial intelligence mechanism (e.g., a trained artificial neural network) 603. The output of the AI system or the look-up table is a set of machine operating parameters 605 corresponding to the set of crop parameters 601. In some implementations, the controller 201 is configured to determine/calculate a set of specific crop parameters from the captured image data and to then provide the metrics as input to the look-up table/AI system 603. However, in some other implementations, the AI system 603 may be configured to receive the forward-facing image data 607 directly as input in addition to or instead of receiving the specific values of the crop parameters as input.

Figure 7:
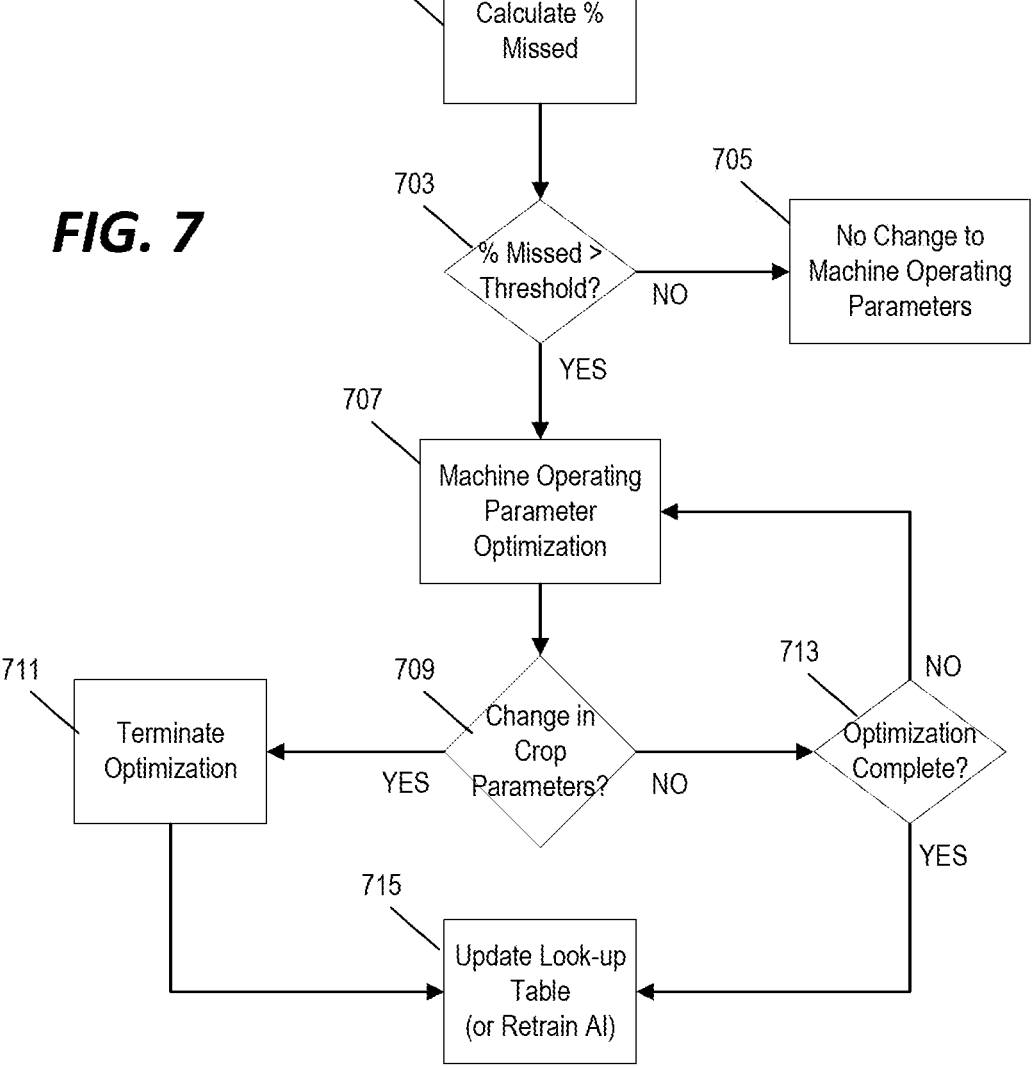
FIG. 7 is a flowchart of a method for updating stored machine operating parameters based on image data feedback using the detasseler machine of FIG. 1A.

FIG. 7 illustrates an example of a method for optimizing the machine operating parameters based on the "missed tassel" metric as feedback. After a set of machine operating parameters (as indicated by the look-up table or the AI system) are applied to the machine, the controller 201 calculates the missed tassel percentage (e.g, as described above in reference to FIG. 3) corresponding to the current machine operating parameters and crop parameters (step 701). If the missed tassel percentage is below an acceptable threshold (step 703), no changes are made to the machine operating parameters (step 705). However, if the missed tassel percentage exceeds the acceptable threshold (step 703), the controller 201 initiates an optimization routine (step 707). The optimization routine continues until a change in the crop parameters is detected (step 709) or the optimization routine is complete (step 713).

If the controller 201 is able to complete the optimization routine before changes in the crop parameters are detected, then the look-up table is updated or the AI system is retrained to correlated the new optimized machine operating parameters to the current set of crop parameters (step 715). Accordingly, when the same set of crop parameters is encountered in the future, the newly determined optimized set of machine operating parameters will be provided as the output of the look-up table or AI system.

However, if the controller 201 detects a significant change in the crop parameters (e.g, the detected average tassel height in the field of view of the front-facing camera changes by a predefined threshold amount) before the controller 201 is able to complete the optimization routine, then the optimization routine is terminated (step 711). In some implementations, when the optimization routine is terminated prematurely, no changes are made to the look-up table or the AI system. However, in some other implementations (such as in the example of FIG. 7), the look-up table or AI system is retrained based on whatever machine operating parameters were being applied when the optimization routine was terminated (step 715). Accordingly, when the same crop parameters are encountered in the future, the controller 201 continues the optimization routine from where it left off when the optimization routine was prematurely terminated.

Figure 8:
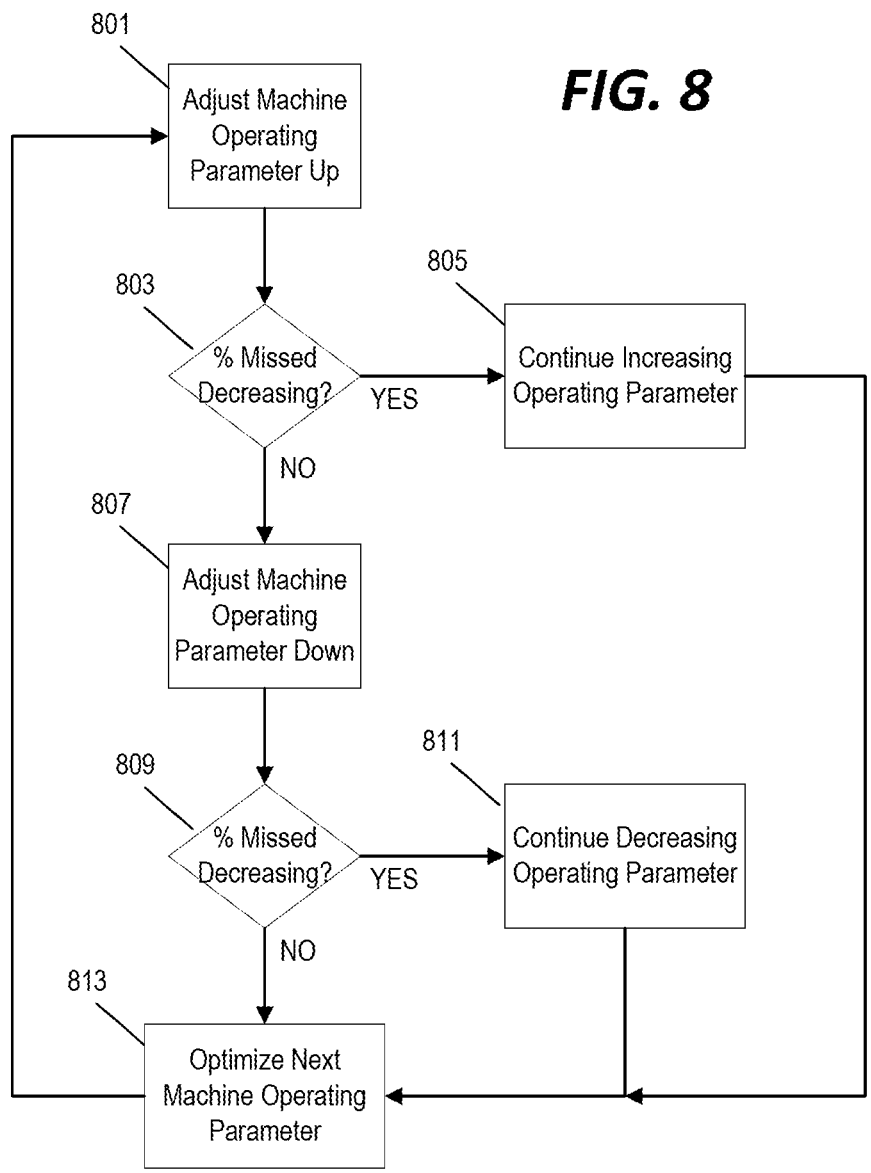
FIG. 8 is a flowchart of a method for optimizing machine operating parameters based on image data feedback using the detasseler machine of FIG. 1A.

In some implementations, the optimization routine applied by the controller 201 may include a proportional-integral-derivative (PID) control mechanism to adjust the machine operating settings to reduce the missed tassel percentage until it falls below the acceptable threshold. In some implementations, adjustments are made to multiple machine operating settings in parallel during the optimization routine while, in other implementations, each machine operating setting is adjusted individually until optimized. FIG. 8 illustrates one such example of a method performed by the controller 201 for optimizing the machine operating parameters corresponding to a given set of crop parameters.

A first machine operating parameter (e.g., vehicle speed, vehicle steering, cutting header height, etc.) is adjust up (step 801) and the controller 201 determines whether the adjustment resulted in a decrease in the missed tassel percentage (step 803). If so, the controller 201 continues to increase the first machine operating parameter (step 805) until the increasing adjustments no longer improve the missed tassel percentage. However, if increasing the first machine operating parameter does not result in a decrease in the missed tassel percentage (step 803), then the controller 201 instead applies a decrease to the first machine operating parameter (step 807) and determines whether the decrease adjustment results in a corresponding decrease of the missed tassel percentage (step 809). If decreasing the first machine operating parameter causes the missed tassel percentage to decrease, then the controller 201 continues to decrease the first machine operating parameter (step 811) until the decreasing adjustments no longer improve the missed tassel percentage. However, if neither increasing nor decreasing the first machine operating parameter results in an improvement to the missed tassel percentage, then the controller 201 proceeds to optimize the next machine operating parameter (step 813) by increasing/decreasing the value/setting of that next machine operating parameter. This process is repeated until each individual machine operating parameter in the set of machine operating parameters is optimized. Then, as discussed above in reference to FIG. 7, the look-up table and/or AI system are updated/retrained to correlate the newly determined optimized set of machine operating parameters with the current set of crop parameters.

Although the examples provided above discuss only a few specific machine operating parameters/settings that may be controlled, adjusted, and/or regulated in order to control the operation of the detasseling machine, in some implementations, other machine operating settings may be automatically adjusted to optimize performance. For example, in some implementations, the controller 201 is configured to adjust power management settings of the machine based on the current crop parameters including, for example, re-distributing power between the engine motive drivetrain of the main vehicle body 103 and the power provided to the cutting mechanisms of the cutter header 105.

Accordingly, the invention provides, among other things, systems and methods for detecting and quantifying the efficiency of a detasseling machine and, in some implementations, systems and methods for automated adjustments to the operation of the detasseling machine using the missed tassel metric as feedback. Other features and advantages of the invention are set forth in the following claims.

What is claimed is:

1. A method for tracking missed tassels left by a detasseling machine, the detasseling machine including a cutter-head with at least one cutter, the method comprising:
performing a detasseling operation in a geospatial area to remove one or more tassels from plants planted in the geospatial area by the at least one cutter;
capturing rear-facing image data by a camera positioned on a main vehicle body of the detasseling machine with a field of view behind the detasseling machine;
applying image processing to the rear-facing image data to quantify a missed tassel metric for the geospatial area based on the rear-facing image data; and
displaying an indication of the missed tassel metric for the geospatial area to an operator of the detasseling machine.

2. The method of claim 1, wherein applying the image processing to the rear-facing image data to quantify the missed tassel metric for the geospatial area include determining a number of missed tassels left attached to plants by the detasseling machine.

3. The method of claim 2, further comprising calculating a missed tassel percentage by comparing the number of missed tassels for the geospatial area to a tassel count for the same geospatial area before the detasseling machine performs the detasseling operation in the geospatial area, and wherein displaying the indication of the missed tassel metric for the geospatial area includes displaying an indication of the missed tassel percentage on a display screen positioned inside an operator cab of the detasseling machine.

4. The method of claim 3, wherein the number of missed tassels includes a number of missed tassels detected in all areas of a field in which the detasseling machine has completed the detasseling operation, and wherein displaying the indication of the missed tassel percentage includes periodically updating a numeric indication of the missed tassel percentage as an accumulated total for the entire field as the detasseling machine continues to move through the field.

5. The method of claim 3, further comprising periodically updating a missed tassel map displayed on the display screen in the operator cab,
wherein the missed tassel map includes a plurality of screen segments each corresponding to a different geospatial sub-area of a field,
wherein calculating the missed tassel percentage by comparing the number of missed tassels for the geospatial area to the tassel count for the same geospatial area includes calculating the missed tassel percentage for each sub-area of the field in which the detasseler machine has completed the detasseling operation, and
wherein updating the missed tassel map includes displaying a color-coding in each screen segment of the plurality of screen segments based on the missed tassel percentage for the geospatial sub-area corresponding to the screen segment.

6. The method of claim 5, wherein periodically updating the missed tassel map includes updating the missed tassel map to include a color-coding for an additional screen segment each time the detasseling machine completes the detasseling operation in an additional geospatial sub-area.

7. The method of claim 3, further comprising:
capturing front-facing image data by a front-facing camera positioned on the detasseling machine with a field of view in front of the detasseling machine; and
applying the image processing to the front-facing image data to quantify the tassel count for the geospatial area based on the front-facing image data.

8. The method of claim 1, further comprising adjusting at least one machine operating parameter during the detasseling operation based on the missed tassel metric.

9. The method of claim 8, wherein the adjusting at least one machine operating parameter comprises adjusting a speed or steering direction of the detasseler machine.

10. The method of claim 8, wherein the adjusting at least one machine operating parameter comprises adjusting a speed of the at least one cutter or a height of the cutterhead relative to a body of the detasseler machine.

11. A system for tracking missed tassels left by a detasseling machine, the system comprising:
a cutterhead mounted to a body of the detasseling machine, the cutterhead including at least one cutter for removing one or more tassels during a detasseling operation from plants planted in a geospatial area;
a rear-facing camera positioned on a main vehicle body of the detasseling machine with a field of view behind the detasseling machine;
a display screen positioned within an operator cab of the detasseling machine; and
an electronic controller configured to
receive rear-facing image data captured by the rear-facing camera,
apply image processing to the rear-facing image data to quantify a missed tassel metric for the geospatial area based on the rear-facing image data, the missed tassel metric corresponding to a number of tassels not removed from plants in the geospatial area by the at least one cutter during the detasseling operation, and
transmit a signal to the display screen causing the display screen to output an indication of the missed tassel metric for the geospatial area.

12. The system of claim 11, wherein the electronic controller is configured to apply the image processing to the rear-facing image data to quantify the missed tassel metric for the geospatial area by determining a number of missed tassels left attached to plants by the detasseling machine.

13. The system of claim 12, wherein the electronic controller is further configured to calculate a missed tassel percentage for the geospatial area by comparing the number of missed tassels for the geospatial area to a tassel count for the same geospatial area, wherein the tassel count is indicative of a number of tassels in the same geospatial area before the detasseling machine performed the detasseling operation in the geospatial area, and
wherein the electronic controller is configured to transmit the signal to the display screen causing the display screen to output the indication of the missed tassel metric for the geospatial area by transmitting a signal to the display screen causing the display screen to display an indication of the missed tassel percentage.

14. The system of claim 13, wherein the number of missed tassels includes an accumulated number of missed tassels detected in all areas of a field in which the detasseling machine has completed the detasseling operation, and wherein the electronic controller is configured to periodically transmit the signal to the display screen causing the display screen to update a numeric indication of the missed tassel percentage as an accumulated total for the entire field as the detasseling machine continues to move through the field.

15. The system of claim 13, wherein the electronic controller is configured to transmit the signal to the display screen causing the display screen to periodically update a missed tassel map displayed on the display screen,
wherein the missed tassel map includes a plurality of screen segments each corresponding to a different geospatial sub-area of a field,
wherein the electronic controller is configured to calculate the missed tassel percentage by comparing the number of missed tassels for the geospatial area to the tassel count for the same geospatial area by calculating the missed tassel percentage for each sub-area of the field in which the detasseler machine has completed the detasseling operation, and
wherein updating the missed tassel map includes displaying a color-coding in each screen segment of the plurality of screen segments based on the missed tassel percentage for the geospatial sub-area corresponding to the screen segment.

16. The system of claim 15, wherein the electronic controller is configured to transmit the signal to the display screen to cause the display screen to periodically update the missed tassel map by updating the missed tassel map to include a color-coding for an additional screen segment each time the detasseling machine completes the detasseling operation in an additional geospatial sub-area.

17. The system of claim 15, further comprising a position determining system, wherein the electronic controller is further configured to determine a current geospatial location of the detasseling machine based on a signal received from the position determining system and to correlate rear-facing image data with a geospatial sub-area of the field based on the determined current geospatial location of the detasseling machine at a time that the rear-facing image data is captured.

18. The system of claim 13, further comprising a front-facing camera positioned on the detasseling machine with a field of view in front of the detasseling machine, and wherein the electronic controller is further configured to
   receive front-facing image data from the front-facing camera, and
   apply the image processing to the front-facing image data to quantify the tassel count for the geospatial area based on the front-facing image data.

19. The system of claim 11, wherein the electronic controller is configured to operably adjust at least one machine operating parameter during the detasseling operation based on the missed tassel metric.

20. The system of claim 19, wherein the at least one machine operating parameter comprises at least one of a speed of the detasseler machine, a steering direction of the detasseler machine, an operating speed of the at least one cutter, and a height of the cutterhead relative to the body of the detasseler machine.

* * * * *